(12) United States Patent  
Kunz (10) Patent No.: US 10,174,537 B1
(45) Date of Patent: Jan. 8, 2019

(54) RIBBON COIL SPRING ANCHOR MOUNT SYSTEM FOR USE IN A WINDOW COUNTERBALANCE ASSEMBLY

(71) Applicant: John Evans' Sons, Inc., Lansdale, PA (US)

(72) Inventor: John R. Kunz, Douglassville, PA (US)

(73) Assignee: John Evans' Sons, Inc., Lansdale, PA (US)

( * ) Notice: Subject to any disclaimer, the term of this patent is extended or adjusted under 35 U.S.C. 154(b) by 0 days.

(21) Appl. No.: 15/715,127

(22) Filed: Sep. 25, 2017

(51) Int. Cl.
- *E05F 1/00* (2006.01)
- *E05D 13/00* (2006.01)
- *F16F 1/10* (2006.01)

(52) U.S. Cl.
CPC ............ *E05D 13/1253* (2013.01); *F16F 1/10* (2013.01); *E05D 13/1276* (2013.01); *E05Y 2201/484* (2013.01); *E05Y 2900/148* (2013.01); *F16F 2224/0208* (2013.01)

(58) Field of Classification Search
CPC .... E05D 13/1253; E05D 13/1276; F16F 1/10; E05Y 2900/148; E05Y 2201/484
USPC ................................... 49/445, 447
See application file for complete search history.

(56) References Cited

U.S. PATENT DOCUMENTS

| | | | | |
|---|---|---|---|---|
| 2,609,193 A | * | 9/1952 | Foster | E05D 13/1292 16/197 |
| 2,732,594 A | * | 1/1956 | Adams et al. | E06B 3/44 16/197 |
| 3,160,914 A | | 12/1964 | Brienza | |
| 3,475,865 A | * | 11/1969 | Arnes | E05D 13/1276 16/197 |
| 5,157,808 A | | 10/1992 | Sterner, Jr. | |
| 5,210,976 A | | 5/1993 | Cripps | |
| 5,232,208 A | * | 8/1993 | Braid | E05D 13/1276 16/197 |
| 5,661,927 A | * | 9/1997 | Polowinczak | E05D 13/1276 49/446 |
| 6,934,998 B1 | | 8/2005 | Shuler | |
| 7,980,028 B1 | * | 7/2011 | Kunz | E05D 13/1276 16/197 |

(Continued)

FOREIGN PATENT DOCUMENTS

| | | |
|---|---|---|
| GB | 1287756 | 9/1972 |
| GB | 2253874 | 9/1992 |

(Continued)

*Primary Examiner* — Jerry E Redman
(74) *Attorney, Agent, or Firm* — LaMorte & Associates, P.C.

(57) ABSTRACT

A counterbalance system for a window sash in a window frame. The window frame has guide tracks. The guide tracks have wall surfaces. The wall surfaces are supported by reinforcement ribs. A mounting slot is formed in the guide track. The mounting slot is formed in a limited area of a wall that is not supported by a reinforcement rib. A coil spring is provided. The coil spring is made of a steel ribbon having a first end, an opposite second end, and a slot engagement configuration proximate said second end. The coil spring has a wide first width from its first end to the slot engagement configuration. This first width is too large to directly engage the mounting slot. The steel ribbon is reduced to a second width through the slot engagement configuration and continuing to the second end to pass into the mounting slot.

19 Claims, 7 Drawing Sheets

(56) References Cited

U.S. PATENT DOCUMENTS

| | | | |
|---|---|---|---|
| 8,181,396 B1* | 5/2012 | Kunz | E05D 13/1276 16/197 |
| 8,505,242 B1* | 8/2013 | Kunz | E05D 13/1276 16/197 |
| 8,640,383 B1* | 2/2014 | Kunz | E05D 15/22 49/181 |
| 9,115,522 B2 | 8/2015 | Sofianek et al. | |
| 2002/0116786 A1* | 8/2002 | Guillemet | E05D 13/1276 16/197 |
| 2005/0091791 A1* | 5/2005 | Kunz | E05D 13/08 16/216 |
| 2005/0160676 A1* | 7/2005 | Pettit | E05D 13/08 49/447 |
| 2005/0198775 A1 | 9/2005 | Petit et al. | |

FOREIGN PATENT DOCUMENTS

| | | |
|---|---|---|
| GB | 2278626 | 12/1994 |
| JP | 05133153 A | 5/1993 |

* cited by examiner

RIBBON COIL SPRING ANCHOR MOUNT SYSTEM FOR USE IN A WINDOW COUNTERBALANCE ASSEMBLY

BACKGROUND OF THE INVENTION

1. Field of the Invention

In general, the present invention relates to counterbalance systems for windows that prevent open window sashes from closing under the force of their own weight. More particularly, the present invention system relates to the structure of coil springs used in such counterbalance systems and the mechanism used to anchor the coil springs to the window frame.

2. Description of the Prior Art

There are many types of windows that are used in modern construction. Some windows are designed to open, some are not. Of the windows that are designed to open, some windows have sashes that open vertically and others have sashes that slide open laterally, or rotate outwardly.

Windows that have vertically opening sashes are the most common window used in residential home construction. Vertically opening windows are either single-hung, having one sash that opens, or double-hung, having two sashes that open. In both single-hung and double-hung windows, a counterbalance system is used to hold a window sash up once it is opened. If no counterbalance system is used, gravity causes the sash of the window to close as soon as it is opened and released. In modern window design, counterbalance systems typically rely upon coiled ribbon springs to provide the force needed to counteract the weight of the window sash. Counterbalancing a window sash with a ribbon coil spring is a fairly simple matter. One end of the coil spring is attached to the window frame while the body of the coil spring is engaged by the sash. The coil spring unwinds as the window sash is opened. The retraction force exerted by the coil spring counterbalances the weight of the window sash. One of the simplest examples of a coil spring counterbalance system is shown in U.S. Pat. No. 2,732,594 to Adams, entitled Double Hung Window Sash.

In order to enable modern window sashes to be tiltable and/or removable, the ribbon coil springs of the counterbalance system are mounted to spring carriages or brake shoes that selectively engage the window sash. The free end of the ribbon coil spring is mounted to the guide track at a high point in the window frame. The free end of the spring can be attached to an anchor mount that is attached to the guide track with screws. Alternatively, the free end of the ribbon coil spring can be formed with a configuration that enables the spring to directly engage a slot or hole formed into the guide track. For a tilt-in load window, a prior art system that uses a slot mount is shown in co-pending U.S. patent application Ser. No. 15/275,394, to Kunz, entitled "Counterbalance System For Tilt-in Window Having A Shielded Brake Shoe Structure". For a side-load window, a slot mounting system is shown in U.S. Pat. No. 8,181,396, to Kunz, entitled Mounting System For A Coil Spring In A Window Counterbalance System.

There are problems associated with anchoring springs into slots within the structure of a window's guide track. In many modern windows, the guide tracks are complex forms made from extruded plastic or extruded aluminum. To minimize the cost of production and weight, guide tracks are not made to be solid. Rather, guide tracks are formed with various internal cavities that extend along the length of the guide tracks. Integrity and strength of the extruded forms are maintained by various reinforcement ribs that extend into the otherwise empty internal cavities.

When a slot or hole is formed into a wall of a guide track, that slot or hole must lead into one of the internal cavities. Furthermore, the slot or hole cannot overlap any of the internal reinforcement ribs within the internal cavities. In many window models, these limitations severely limit the size of the slot or hole that can be formed. As a consequence, the dimensions of the spring entering the slot or hole must also be limited in size so it can fit into the small slot. The size limitations of the slot are often smaller than the dimensions of the free end of the most common ribbon coil springs. As such, the ribbon coil springs are too large to engage the slot. Consequently, alternate mounting systems, such as screw mounts must be used to anchor the free end of the ribbon coil spring in place.

In many window models, the use of slots to anchor ribbon coil springs is preferred over anchor mounts and screws. This is because the use of external anchor mounts can limit the movement range of a window sash. The use of anchor screws increases the cost and complexity of the window assembly. The use of anchor screws also requires that hand tools be available during the installation of the counterbalance system.

Slot mounts can be used if the width of the ribbon coil spring were reduced to match the dimensions of the slot. However, the strength of a ribbon coil spring is directly proportional to its width. Any decrease in width of a coil spring along its length would diminish its strength. A need therefore exists for a way to use slots to anchor the coil springs of a counterbalance system that are otherwise too large to engage the slots. This need is met by the present invention as described and claimed below.

SUMMARY OF THE INVENTION

The present invention is a counterbalance system for counterbalancing the weight of a window sash in a window frame. The window frame has guide tracks that guide the movement of the window sash. The guide tracks have wall surfaces. The wall surfaces are supported by reinforcement ribs behind the wall surfaces.

A mounting slot is formed in the guide track. The mounting slot is formed in a limited area of a wall that is not supported by a reinforcement rib. This limited area governs the size of the mounting slot.

A coil spring is provided. The coil spring is made of a steel ribbon having a first end, an opposite second end, and a slot engagement configuration proximate said second end. For strength, the coil spring has a wide first width from its first end to the slot engagement configuration. This first width is too large to directly engage the mounting slot. The steel ribbon is reduced to a second width through the slot engagement configuration and continuing to the second end. The second width is sized to pass into the mounting slot.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be adapted for use in many models of windows, only two exemplary embodiments are illustrated and described. The exemplary embodiments include an example of a tilt-in window and an example of a side load window. These exemplary embodiments are selected in order to set forth two of the best modes contemplated for the invention. The exemplary embodiments, however, are only intended to be examples and should not be considered limitations when interpreting the scope of the appended claims.

Figure 1:
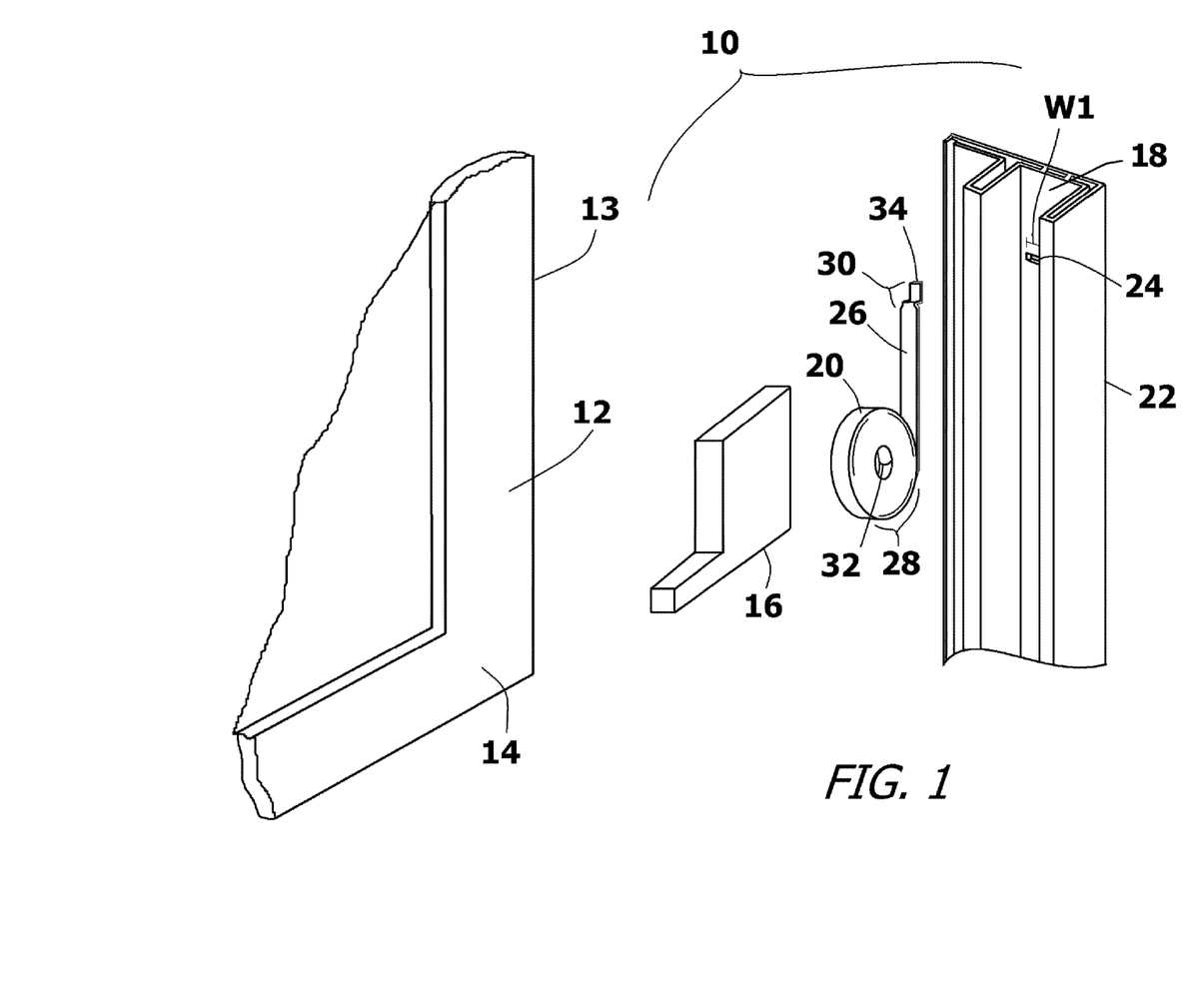
FIG. 1 is a fragmented perspective view of an exemplary embodiment of a counterbalance system for a window.

Referring to FIG. 1, the counterbalance system 10 for a window sash 12 of a side load window 13 is shown. The window sash 12 has a sash frame 14 that selectively engages a spring carriage 16. In the shown embodiment, the spring carriage 16 has a simplistic design and holds a single coil spring 20. However, it will be understood that spring carriages of many types are used in the industry and many are configured to hold multiple coil springs.

The spring carriage 16 rides in a guide track 18 that is formed in a window frame 22 on the sides of the window sash 12. In a side load window 13, the guide tracks 18 of most manufacturers' models have an extruded plastic construction. However, aluminum and wood guide tracks also exist. Mounting slots 24 are formed in the guide tracks 18 at the points where a coil spring 20 is to be connected to the window frame 22. Steel ribbon 26 is used to create the coil spring 20. The mounting slots 24 each have a width W1. The width W1 must be just slightly wider than the width of the portion of the steel ribbon 26 that passes into the mounting slot 24. Furthermore, each mounting slot 24 has a height that is slightly larger than the gauge of steel used in the steel ribbon 26 of the coil spring 20.

The steel ribbon 26 of the coil spring 20 is wound and biased into a coiled configuration 28. Accordingly, the coil spring 20 resists being unwound. The steel ribbon 26 has two ends 32, 34. When the steel ribbon 26 is wound into the shape of the coil spring 20, its first end 32 is located on the interior of the coiled configuration 28. The second free end 34 of the steel ribbon 26 terminates on the exterior of the coiled configuration 28.

Figure 2:
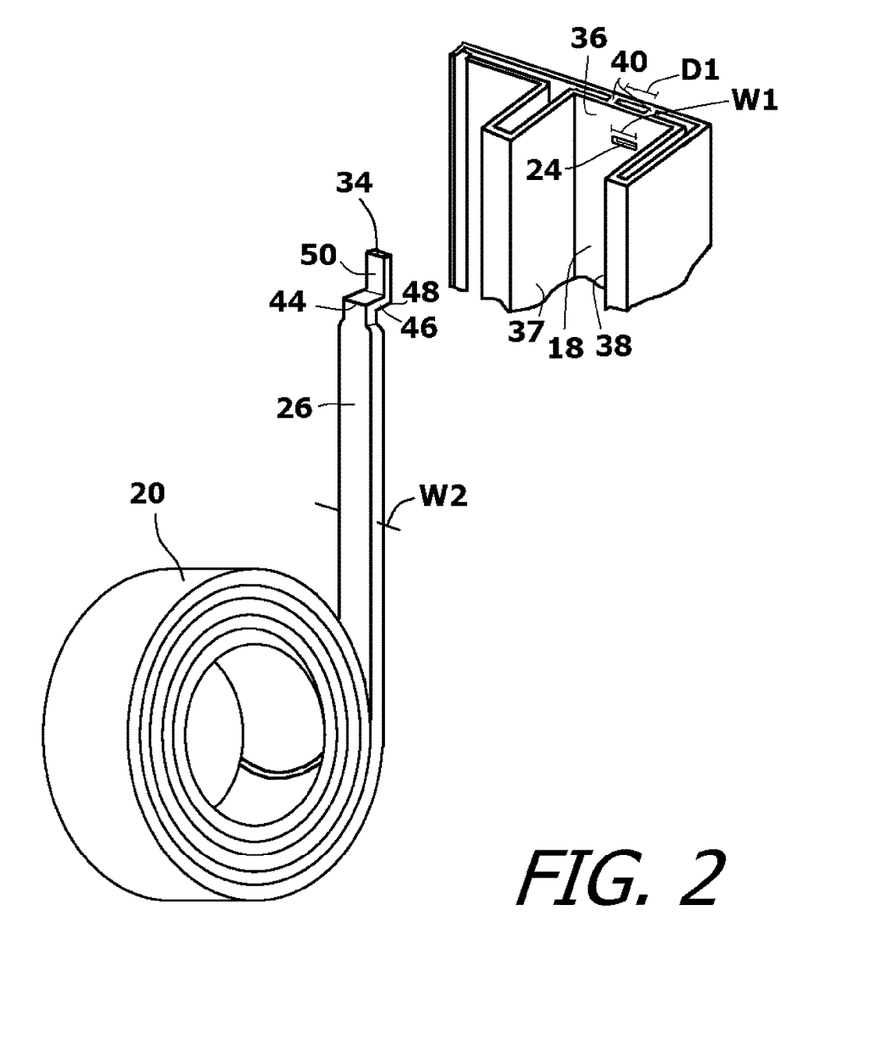
FIG. 2 is an enlarged perspective view of a coil spring used within the counterbalance system.

The free end 34 of the steel ribbon 26 is formed into a slot engagement configuration 30. The slot engagement configuration 30 is shaped to engage a mounting slot 24 in the guide track 18, as will later be explained in detail. Referring to FIG. 2 in conjunction with FIG. 1, it can be seen that the guide track 18 of a side load window 13 is a generally U-shaped track with a rear wall 36 and two opposing side walls 37, 38. The free end 34 of the coil spring 20 must attach to the rear wall 36 of the guide track 18. The preferred position of attachment is in the center of the rear wall 36 at a point equidistant from the opposing side walls 37, 38. The steel ribbon 26 of the coils spring 20 has a primary ribbon width W2. As such, the preferred width W1 of the mounting slot 24 would be slightly wider than the primary width W2 of the steel ribbon 26. A potential obstruction occurs because in the shown embodiment of the guide track 18, there are two reinforcement ribs 40 behind the rear wall 36. The distance D1 between the two reinforcement ribs 40 is shorter than the primary width W2 of the steel ribbon 26 of the coil spring 20. Accordingly, if a mounting slot 24 were formed in the rear wall 36 large enough to accommodate the primary width W2 of the coil spring 20, then the presence of the reinforcement ribs 40 would interfere with the mounting slot 24 and prevent the coil spring 20 from engaging the mounting slot 24.

Figure 3:
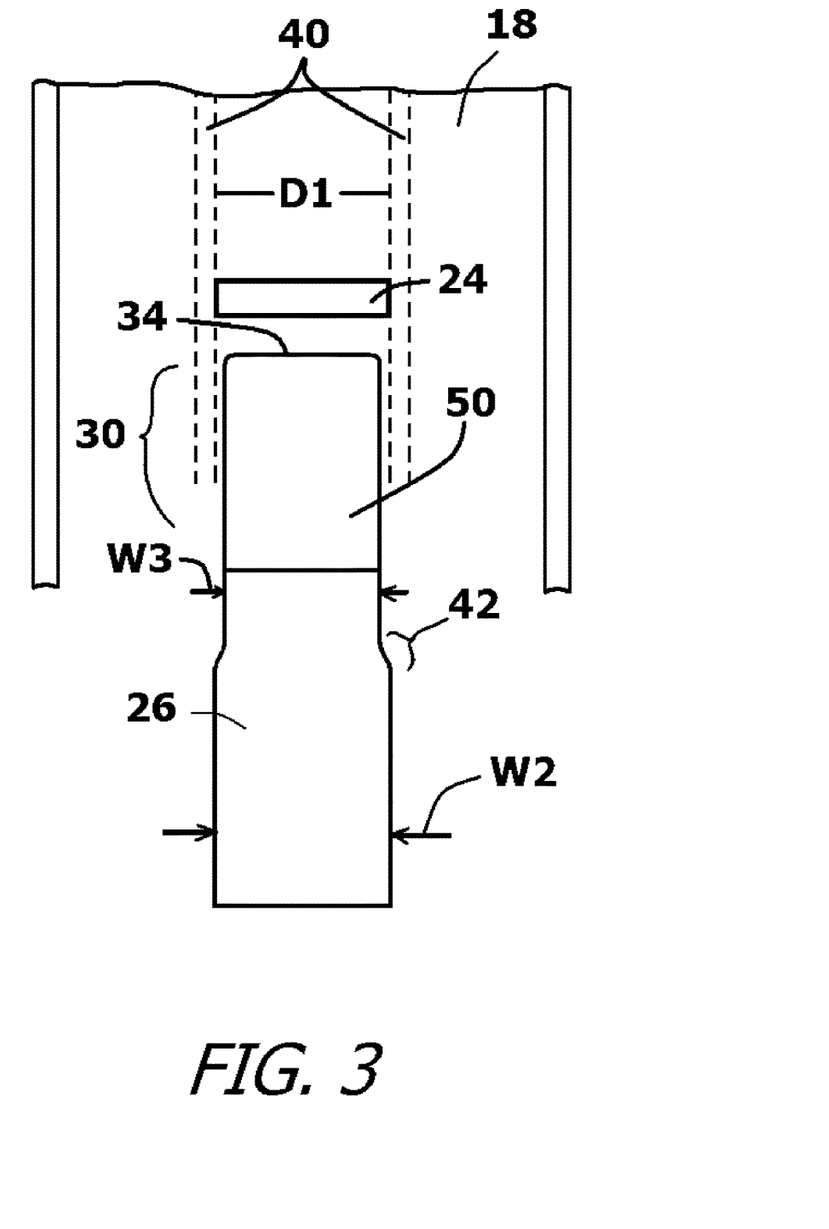
FIG. 3 is a front view of a coil spring and a segment of a guide track containing a mounting slot.

Referring to FIG. 3 in conjunction with FIG. 2, it can be seen that the mounting slot 24 can be no wider than the distance D1 between the reinforcement ribs 40 behind the rear wall 36 of the guide track 18. This width is smaller than the primary width W2 of the steel ribbon 26. In order to engage the mounting slot 24, the slot engagement configuration 30 is adapted to the dimensions of the mounting slot 24.

The steel ribbon 26 of the coil spring 20 has a constant width W2 from its first end 32 to the beginning of the slot engagement configuration 30. This constant width W1 is the primary width of the coil spring 20. At the beginning of the slot engagement configuration 30, there is a short transition zone 42 where the width of the steel ribbon 26 reduces from its primary width W2 to a shortened secondary width W3. The secondary width W3 of the slot engagement configuration 30 remains constant from the transition zone 42 to the free end 34. The secondary width W3 is just slightly narrower than the mounting slot 24 that leads into the rear wall 36 of the guide track 18 between the two reinforcement ribs 40. The transition zone 42 is short, having a preferred length along the steel ribbon 26 of approximately $\frac{1}{8}^{th}$ of an inch. A first bend 44 is formed in the steel ribbon 26 between ¼ inch and ⅛ inch beyond the start of the transition zone 42. At the first bend 44, the direction of the steel ribbon 26 changes by ninety degrees. Accordingly, after the first bend 44, the steel ribbon 26 is perpendicular to its orientation through the transition zone 42. The steel ribbon 26 extends through a short lateral section 46 as it progresses between the first bend 44 and a subsequent second bend 48. The lateral section 46 has a length that is just slightly greater than the thickness of the rear wall 36 of the guide track 18. At the second bend 48, the steel ribbon 26 again bends ninety degrees back into its original orientation. This creates a locking lip 50 that extends from the second bend 48 to the free end 34 of the steel ribbon 26. The locking lip 50 has a length of at least one-quarter inch so that it will not inadvertently retreat out of the mounting slot 24.

Figure 4:
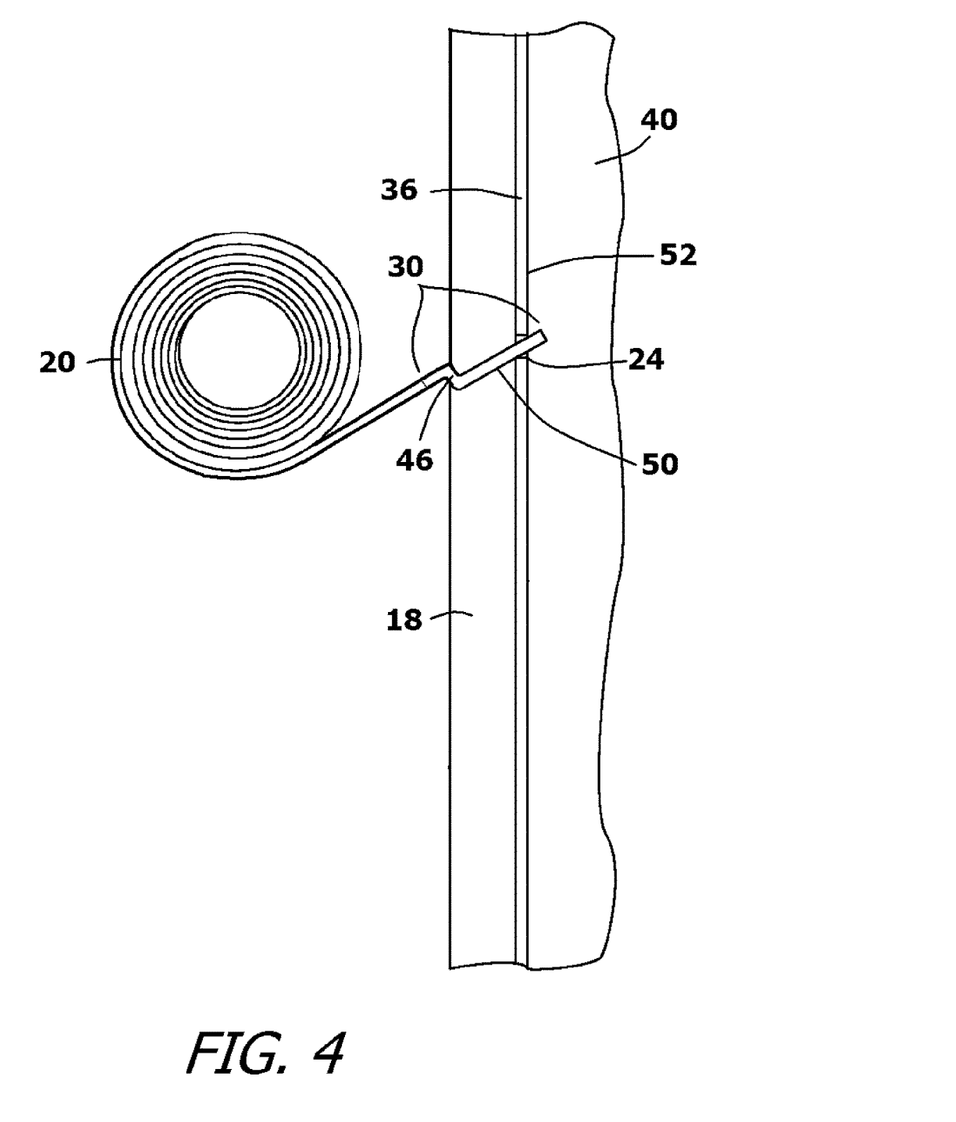
FIG. 4 is a side view of a coil spring and a segment of a guide track containing a mounting slot.
Figure 5:
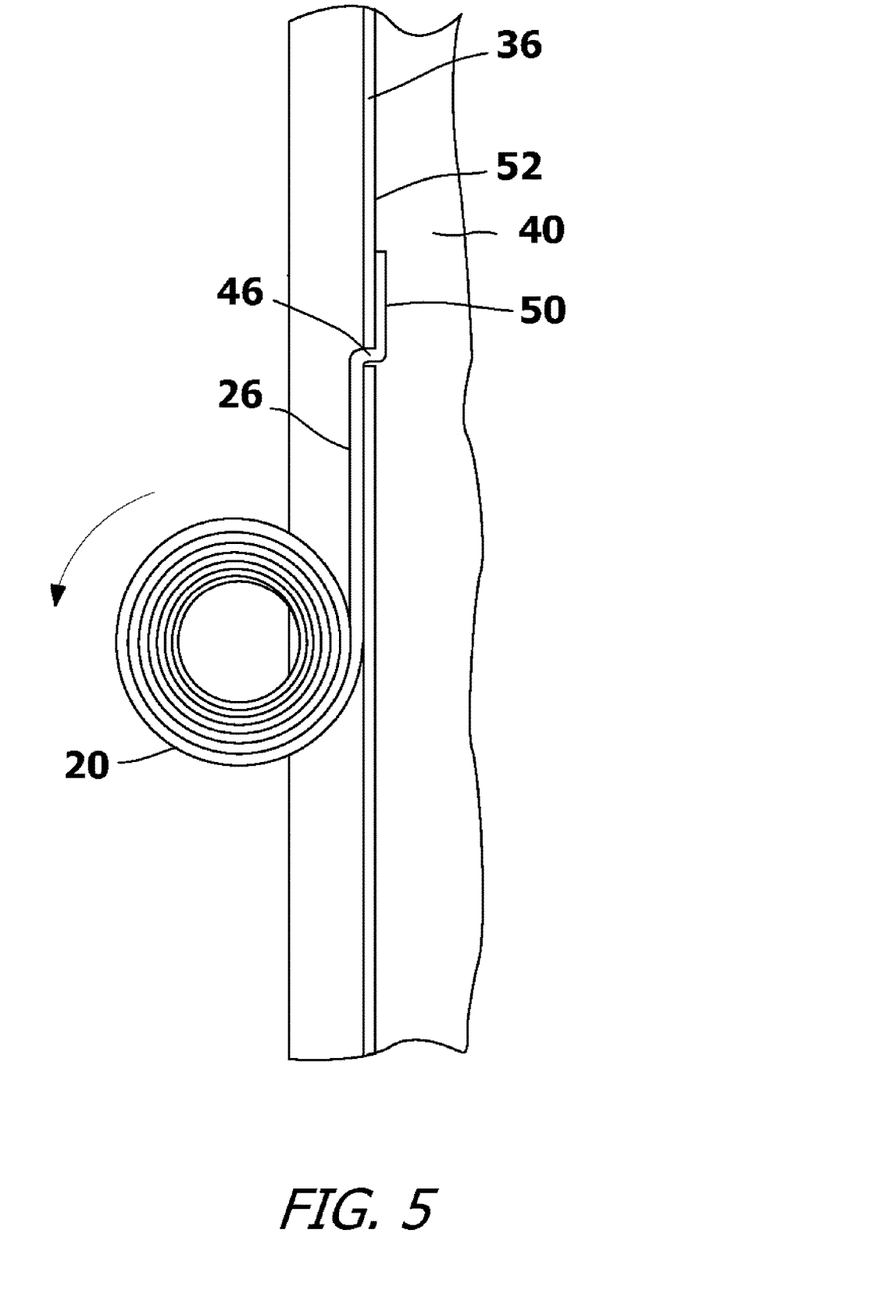
FIG. 5 shows the same matter as FIG. 4 with the coil spring fully engaging the mounting slot.

Referring to FIG. 3, FIG. 4, and FIG. 5, it can be seen that the locking lip 50 and the lateral section 46 of the slot engagement configuration 30 pass through the mounting slot 24 in the guide track 18 of the window frame 22 and pass between the reinforcement ribs 40. This is only possible due to the reduced width W3 of these elements. Leading into the mounting slot 24, the only exposed section of the steel ribbon 26 that is reduced from its primary width W2 is the small section of the transition zone 42 that leads into the mounting slot 24. This exposed section is less than ⅛ of an inch long since it represents only a segment of the transition zone 42. This very small area of reduced width has negligible effects on the overall strength of the coil spring 20. When the slot engagement configuration 30 is inserted into the mounting slot 24, the locking lip 50 presses flush against an inside surface 52 of the rear wall 36 of the guide track 18. The slot engagement configuration 30 is, therefore, mechanically interlocked with the mounting slot 24 and cannot move up or down.

As the coil spring 20 is pulled downward by the movement of the window sash, the coil spring 20 begins to unwind. The curvature of the coil spring 20 causes the locking lip 50 to press against the inside surface 52 of the rear wall 36 of the guide track 18. More importantly, the sections of the coil spring 20 that unwind from the coiled configuration 28 are biased against the exposed rear wall 36 of the guide track 18. The steel ribbon 26, therefore, remains pressed against the guide track 18 and out of sight as the coil spring 20 moves up and down while winding and unwinding.

The slot engagement configuration 30 can be inserted into the mounting slot 24 by a simple manipulation of the coil spring 20. This manipulation can be easily automated for manufacture. Furthermore, the coil spring 20 does not need to be partially unwound in order to connect the coil spring 20 to the guide track 18. Lastly, the mechanical interconnection between the slot engagement configuration 30 and the mounting slot 24 does not require the use of mechanical fasteners, such as screws or locking pins. It will therefore be understood that the slot engagement configuration 30 of the coil spring 20 can be connected to a guide track 18 in a highly cost effective and labor efficient manner.

Figure 6:
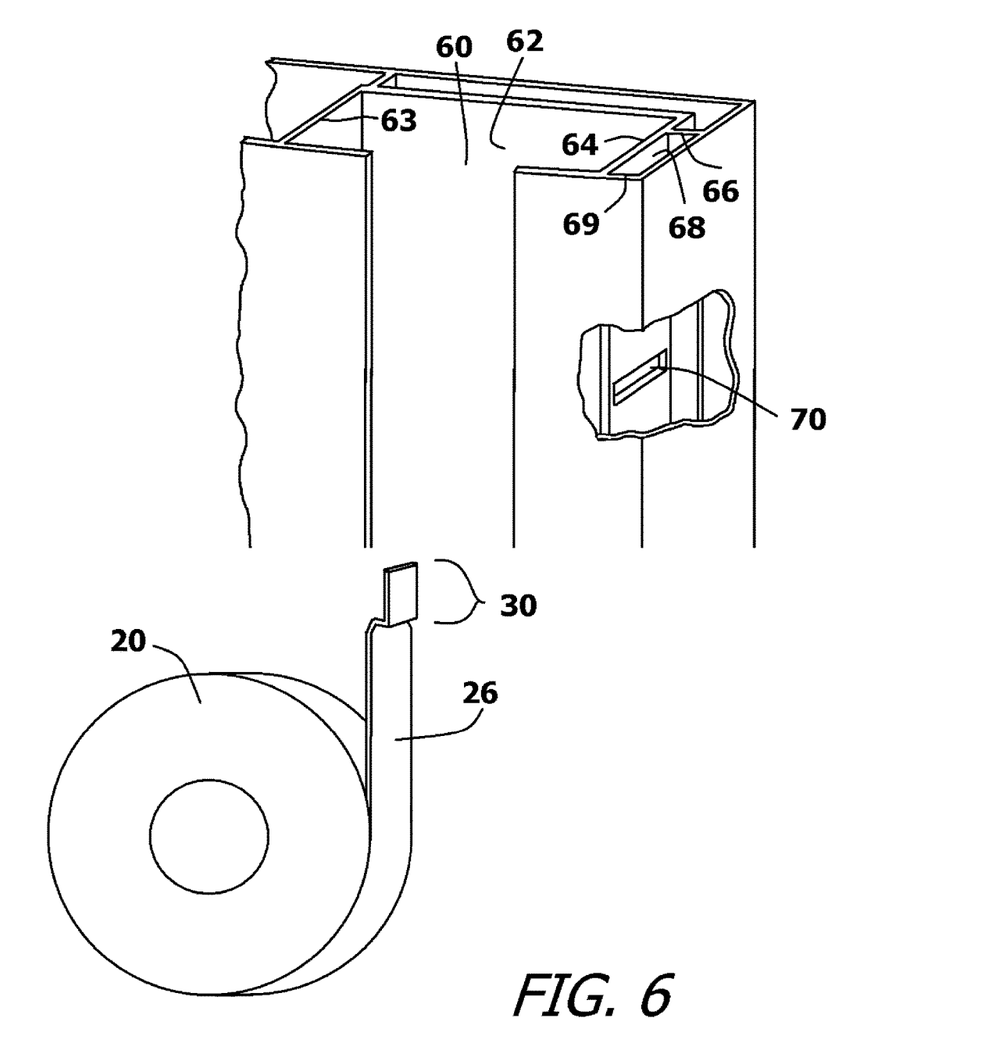
FIG. 6 is an enlarged perspective view of a coil spring used to engage the guide track of a tilt-in window.

Referring now to FIG. 6, the coil spring 20 of the previous embodiment is now being applied to the counterbalance system of a tilt-in window. The tilt-in window has a guide track 60 with a rear wall 62 and two opposing side walls 63, 64. In the model of tilt-in window being shown, the slot engagement configuration 30 of the coil spring 20 is mounted to one of the side walls 64. Behind that side wall 64, there is a reinforcement rib 66. A gap 68 exists between that reinforcement rib 66 and the front edge 69 of the side wall 64. A mounting slot must be formed between the reinforcement rib 66 and the front edge 69 of the side wall 64. Accordingly, the width of the mounting slot 70 must be shorter than the width of the gap 68.

The slot engagement configuration 30 has the same configuration as was previously described. However, the width of the steel ribbon 26 in the slot engagement configuration 30 is sized to fit into the mounting slot 70.

Figure 7:
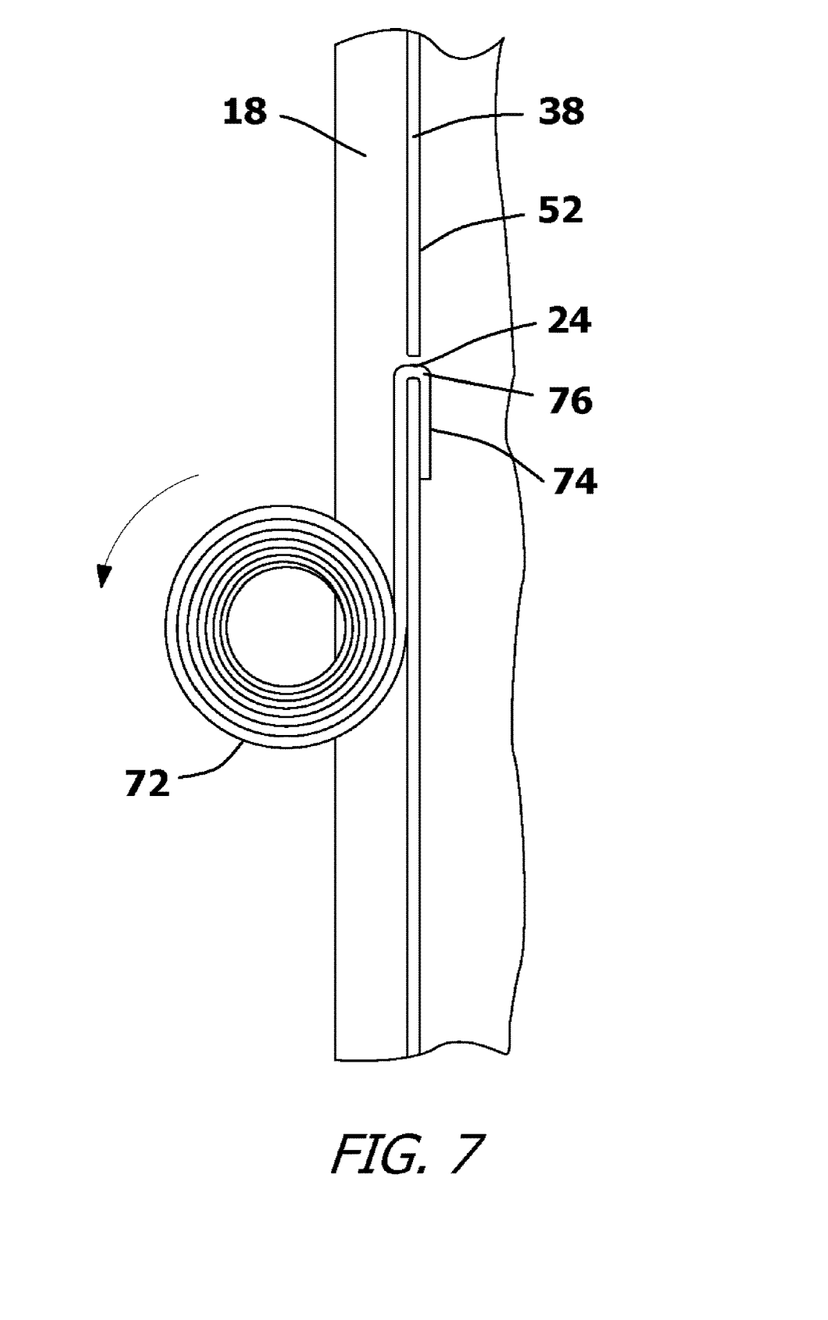
FIG. 7 shows an alternate embodiment of a coil spring and a selectively cross-sectioned view of a segment of a guide track containing a mounting slot.

Referring to FIG. 7, an alternate embodiment of a coil spring 72 is shown. In this embodiment, the coil spring 72 has the same configuration as the coil spring previously shown, except that the locking lip 74 is bent in the opposite direction at the second bend 76. As a result, the coil spring 72 terminates with a hooked shape that is thin enough to engage a mounting slot. When inserted into the mounting slot 24, it will be understood that the locking lip 74 will pass through the mounting slot 24. The locking lip 74 then extends downwardly and presses against the inside surface 52 of the rear wall 38 of the guide track 18.

It will be understood that the embodiments of the present invention are merely exemplary and that a person skilled in the art can make many variations to those embodiments. For instance, the length of the locking lip can be varied and the curvature of the locking lip can be varied. The first and second bends can be more or less than ninety degrees. All such variations, modifications, and alternate embodiments are intended to be included within the scope of the present invention as defined by the claims.

What is claimed is:

1. A counterbalance system for counterbalancing the weight of a window sash of a window frame, said system comprising:
 a guide track disposed within said window frame for guiding movement of said window sash;
 a mounting slot formed in said guide track;
 a coil spring of wound steel ribbon having a first end, an opposite second end, and a transition zone, wherein said coil spring has a constant first width between said first end and said transition zone and a constant second width between said transition zone and said second end, wherein said constant second width is less than said constant first width;
 a first bend in said coil spring between said transition zone and said second end;
 a second bend in said coil spring between said first bend and said second end;
 wherein said first bend and said second bend form a slot engagement configuration that engages said mounting slot formed in said guide track.

2. The system according to claim 1, wherein said transition zone begins at said constant first width and ends at said constant second width.

3. The system according to claim 2, wherein said transition zone is no longer than ⅛ of an inch along said steel ribbon.

4. The system according to claim 1, wherein said steel ribbon extends no more than ⅛ of an inch between said first bend and said second bend.

5. The system according to claim 1, wherein said guide track has walls supported by reinforcement ribs, wherein said mounting slot is formed through one of said walls immediately adjacent at least one of said reinforcement ribs.

6. The system according to claim 5, wherein said walls include a rear wall that extends between two side walls.

7. The system according to claim 6, wherein said mounting slot is disposed in said rear wall.

8. The system according to claim 6, wherein said mounting slot is disposed in one of said side walls.

9. The system according to claim 2, wherein said first bend in said slot engagement configuration is a 90 degree bend and said second bend is a 90 degree bend.

10. The system according to claim 1, wherein said steel ribbon extends at least ¼ inch between said second bend and said second end.

11. A coil spring for a window counterbalance system, said coil spring comprising:
 a steel ribbon wound into a coil spring, said steel ribbon having a first end, an opposite second end, and a transition zone between said first end and said second end, wherein said steel ribbon has a constant first width between said first end and said transition zone and a constant second width from said transition zone to said second end, wherein said constant second width is less than said constant first width;
 a first bend in said coil spring between said transition zone and said second end;
 a second bend in said coil spring between said first bend and said second end;
 wherein said first bend and said second bend form a slot engagement configuration.

12. The system according to claim 11, wherein said transition zone begins at said constant first width and ends at said constant second width.

13. The system according to claim 12, wherein said transition zone is no longer than ⅛ of an inch along said steel ribbon.

14. The system according to claim 12, wherein said first bend of said slot engagement configuration is a 90 degree bend and said second bend of said slot engagement configuration is a 90 degree bend.

15. The system according to claim 11, wherein said steel ribbon extends no more than ⅛ of an inch between said constant first bend and said constant second bend.

16. A coil spring for a window counterbalance system, said coil spring comprising:
a steel ribbon wound into a coil spring, said steel ribbon having a first end and an opposite second end, wherein said steel ribbon has a transition zone within one inch of said second end, wherein said steel ribbon has a constant first width between said first end and said transition zone, and a constant second width between said transition zone and said second end, wherein said second width is less than said first width;
a first bend in said steel ribbon between said transition zone and said second end;
a second bend in said coil ribbon between said first bend and said second end.

17. The system according to claim 16, wherein said transition zone is no longer than ⅛ of an inch along said steel ribbon.

18. The system according to claim 17, wherein said first bend is a 90 degree bend and said second bend is a 90 degree bend.

19. The system according to claim 16, wherein said steel ribbon extends no more than ⅛ of an inch between said first bend and said second bend.

\* \* \* \* \*